United States Patent
Chiba et al.

(10) Patent No.: US 7,331,171 B2
(45) Date of Patent: Feb. 19, 2008

(54) CONTROL SYSTEM AND METHOD FOR INTERNAL COMBUSTION ENGINE

(75) Inventors: Isao Chiba, Saitama (JP); Ryuji Matsukado, Saitama (JP); Ryuta Matsui, Saitama (JP); Yoshinori Ishihara, Saitama (JP); Isao Kaneko, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/455,672

(22) Filed: Jun. 20, 2006

(65) Prior Publication Data

US 2006/0283421 A1  Dec. 21, 2006

(30) Foreign Application Priority Data

Jun. 21, 2005  (JP) .............................. 2005-181230

(51) Int. Cl.
 *F01N 3/00*  (2006.01)
 *F02D 41/38*  (2006.01)

(52) U.S. Cl. ...................... 60/286; 123/196 S; 123/299

(58) Field of Classification Search ............ 123/196 R, 123/196 S, 299, 478, 480, 494; 60/286, 60/295

See application file for complete search history.

(56) References Cited

U.S. PATENT DOCUMENTS

| 6,810,858 | B2 * | 11/2004 | Ito et al. ..................... 123/478 |
| 6,966,304 | B2 * | 11/2005 | Nagaishi et al. ............. 123/480 |
| 7,043,903 | B2 * | 5/2006 | Onodera et al. .............. 60/295 |
| 7,104,050 | B2 * | 9/2006 | Sato et al. .................... 60/295 |
| 7,181,909 | B2 * | 2/2007 | Sato et al. .................... 60/297 |
| 2003/0200952 | A1 | 10/2003 | Ito et al. |
| 2005/0188685 | A1 * | 9/2005 | Folliot et al. ................ 60/286 |
| 2005/0223700 | A1 * | 10/2005 | Abe ............................. 60/295 |

FOREIGN PATENT DOCUMENTS

| EP | 1 247 969 A2 | 10/2002 |
| EP | 1 357 280 A2 | 10/2003 |
| JP | 10-317936 A | 12/1998 |
| JP | 2003-120390 A | 4/2003 |

\* cited by examiner

*Primary Examiner*—T. M Argenbright
(74) *Attorney, Agent, or Firm*—Arent Fox LLP

(57) ABSTRACT

A control system for an internal combustion engine that executes post injection, which is capable of accurately estimating the state of dilution of engine oil, thereby properly controlling the amount of oil dilution such that it does not become too large. In an internal combustion engine having an injector that injects fuel into a combustion chamber, post injection is executed in which fuel is injected from the injector during the expansion stroke or the exhaust stroke of the engine, based on a detected operating condition of the engine. The amount of dilution of engine oil diluted with fuel injected by post injection is calculated. The amount of fuel evaporated from the engine oil is calculated. A state of dilution of the engine oil is estimated based on the calculated engine dilution amount and the calculated fuel evaporation amount.

4 Claims, 6 Drawing Sheets

CONTROL SYSTEM AND METHOD FOR INTERNAL COMBUSTION ENGINE

BACKGROUND OF THE INVENTION

1. Field of the Invention

This invention relates to a control system and method for an internal combustion engine, such as a diesel engine, that injects fuel into a combustion chamber during the expansion stroke or the exhaust stroke.

2. Description of the Related Art

Conventionally, this kind of control system for a diesel engine is disclosed in Japanese Laid-Open Patent Publication (Kokai) No. 2003-269230. This diesel engine (hereinafter referred to as "the engine") has a swirl control valve disposed in an intake pipe, for producing a swirl in the combustion chamber, and a filter disposed in an exhaust pipe, for collecting particulates contained in exhaust gases. The control system not only injects fuel necessary for combustion of the engine, but also executes post injection in which fuel is injected into the combustion chamber during the expansion stroke or the exhaust stroke, as required. The post injection causes unburned fuel to be contained in exhaust gases, and then be burned e.g. at a filter, to thereby increase the temperature of the filer to burn PM deposited on the filter, whereby the filter is regenerated.

Further, when such post injection is executed, part of fuel subjected to post injection during the exhaust stroke attaches to the cylinder wall without being exhausted form the combustion chamber, and the attached fuel is mixed into the engine oil to cause oil dilution. To overcome this problem, the conventional control system controls the swirl control valve during execution of post injection to produce a swirl, whereby atomization of fuel supplied by post injection is accelerated to thereby suppress attachment of fuel to the cylinder wall.

As described above, the conventional control system produces a swirl when executing post injection. The swirl is, however, produced in a manner caused by the suction operation of the engine. Therefore, during the expansion stroke and exhaust stroke in which post injection is executed after the suction operation of the engine, the swirl diminishes, which prevents sufficient atomization of fuel supplied by post injection, and hence oil dilution cannot be necessarily prevented. Therefore, there is a fear that the function of engine oil, such as lubrication of the engine, cannot be maintained.

SUMMARY OF THE INVENTION

It is an object of the present invention to provide a control system and method for an internal combustion engine that executes post injection, which are capable of accurately estimating the state of dilution of engine oil, thereby properly controlling the amount of oil dilution such that it does not become too large.

To attain the above object, in a first aspect of the present invention, there is provided a control system for an internal combustion engine having an injector for injecting fuel into a combustion chamber, comprising operating condition-detecting means for detecting an operating condition of the engine, post injection control means for executing post injection in which fuel is injected from the injector during an expansion stroke or an exhaust stroke of the engine, based on the detected operating condition of the engine, engine oil dilution amount-calculating means for calculating an amount of dilution of engine oil diluted with fuel injected by post injection, fuel evaporation amount-calculating means for calculating an amount of fuel evaporation from the engine oil, and engine oil dilution state-estimating means for estimating a state of dilution of the engine oil based on the calculated amount of dilution of engine oil and the calculated amount of fuel evaporation.

With the configuration of the control system according to the first aspect of the invention, the injection control means executes post injection in which fuel is injected from the injector during the expansion stroke or the exhaust stroke of the engine, based on the detected operating condition of the engine, and the engine oil dilution amount-calculating means calculates the amount of dilution of engine oil diluted with fuel injected by post injection. Further, the fuel evaporation amount-calculating means calculates the amount of fuel evaporation from the engine oil, and the engine oil dilution state-estimating means estimates the state of dilution of engine oil based on the calculated amount of fuel evaporation and the calculated amount of dilution of engine oil.

Part of fuel injected by fuel injection attaches to the cylinder walls of the engine and is then mixed in engine oil to dilute the same. Further, the fuel thus mixed in the engine oil evaporates therefrom during the following normal operation during which post injection is not executed. Therefore, by estimating the state of dilution of engine oil based on the amount of dilution of engine oil and the amount of fuel evaporation, the estimation can be accurately performed. Therefore, e.g. by controlling the engine according to the accurately estimated state of dilution of engine oil, it is possible to control post injection such that the amount of oil dilution does not become too large.

Preferably, the control system comprises post injection amount-reducing means for reducing an amount of fuel injected by post injection executed by the post injection control means, according to the state of dilution of engine oil estimated by the engine oil dilution state-estimating means.

With the configuration of this preferred embodiment, the post injection amount-reducing means reduces the post injection amount according to the state of dilution of engine oil estimated by the engine oil dilution state-estimating means. Thus, the post injection amount is reduced according to the state of dilution of engine oil. Therefore, for example, by inhibiting post injection when the amount of oil dilution is relatively large, the amount of oil dilution can be controlled to such a level that the intended function of engine oil can be maintained.

To attain the above object, in a second aspect of the present invention, there is provided a method of controlling an internal combustion engine having an injector for injecting fuel into a combustion chamber, comprising an operating condition-detecting step of detecting an operating condition of the engine, a post injection control step of executing post injection in which fuel is injected from the injector during an expansion stroke or an exhaust stroke of the engine, based on the detected operating condition of the engine, an engine oil dilution amount-calculating step of calculating an amount of dilution of engine oil diluted with fuel injected by post injection, a fuel evaporation amount-calculating step of calculating an amount of fuel evaporation from the engine oil, and an engine oil dilution state-estimating step of estimating a state of dilution of the engine oil based on the calculated amount of dilution of engine oil and the calculated amount of fuel evaporation.

With the configuration of the control method according to the second aspect of the invention, it is possible to obtain the same advantageous effects as provided by the control system according to the first aspect of the present invention.

Preferably, the method comprises a post injection amount-reducing step of reducing an amount of fuel injected by post injection executed in the post injection control step, according to the state of dilution of engine oil estimated in the engine oil dilution state-estimating step.

With the configuration of this preferred embodiment, it is possible to obtain the same advantageous effects as provided by the preferred embodiment of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
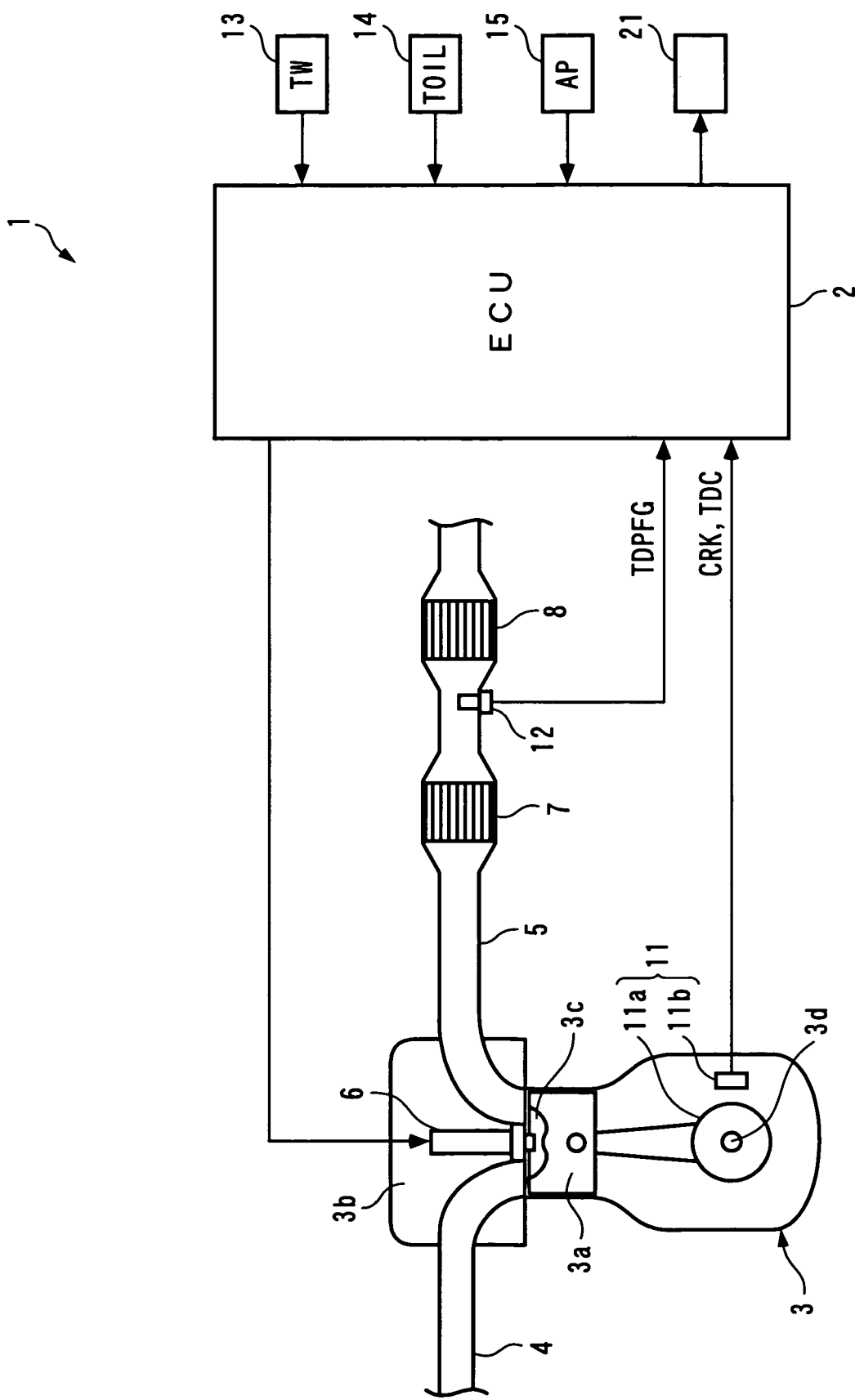
FIG. 1 is a schematic diagram of an internal combustion engine to which is applied a control system according to the embodiment of the present invention.

The present invention will now be described in detail with reference to the drawings showing preferred embodiments thereof. Referring first to FIG. 1, there is schematically shown the arrangement of an internal combustion engine 3 to which is applied a control system 1 according to an embodiment of the present invention. The internal combustion engine 3 (hereinafter simply referred to as "the engine") is a diesel engine e.g. of a four-cylinder type, and installed on an automotive vehicle (not shown).

A combustion chamber 3c is defined between a piston 3a and a cylinder head 3b of the engine 3. The cylinder head 3b has an intake pipe 4 and an exhaust pipe 5 connected thereto, with a fuel injection valve (hereinafter referred to as "the injector") 6 mounted therethrough such that it faces the combustion chamber 3c.

The injector 6 is inserted into the combustion chamber 3c through a central portion of the top wall thereof, and is connected to a high-pressure pump and then to a fuel tank, neither of which is shown, via a common rail. Fuel contained in the fuel tank is pressurized by the high-pressure pump to a high pressure, and then sent via a common rail to the injector 6, from which the pressurized fuel is injected into the combustion chamber 3c. Further, a fuel injection amount QINJ and fuel injection timing of fuel injected from the injector 6 are set by an ECU 2, referred to hereinafter. The valve-opening time period and valve-opening timing of the injector 6 are controlled by a drive signal delivered from the ECU 2, such that the fuel injection amount QINJ and the fuel injection timing thus set are obtained.

A magnet rotor 11a is mounted on a crankshaft 3d of the engine 3. The magnet rotor 11a and an MRE pickup 11b form a crank angle sensor 11 (operating condition-detecting means) which delivers a CRK signal and a TDC signal, which are both pulse signals, to the ECU 2 along with rotation of the crankshaft 3d.

Each pulse of the CRK signal is generated whenever the crankshaft 3d rotates through a predetermined crank angle (e.g. 30°). The ECU 2 calculates rotational speed (hereinafter referred to as "the engine speed") NE of the engine 3 based on the CRK signal. The TDC signal indicates that the piston 3a of each cylinder is at a predetermined crank angle position in the vicinity of the top dead center (TDC) at the start of the suction stroke thereof, and in the case of the four-cylinder engine of the illustrated example, it is delivered whenever the crankshaft 3d rotates through 180 degrees.

The exhaust pipe 5 has an oxidation catalyst 7 and a filter 8 arranged therein at respective locations from upstream to downstream in the mentioned order. The oxidation catalyst 7 oxidizes HC and CO in exhaust gases to reduce exhaust emissions. The filter 8 is configured such that it collects particulates (hereinafter simply referred to as "PM" (Particulate Matter)), such as soot, from exhaust gases to thereby reduce the amount of PM emitted into the air. Further, the surface of the filter 8 carries the same catalyst (not shown) as the oxidation catalyst 7.

Further, an exhaust gas temperature sensor 12 is inserted into the exhaust pipe 5 at a location immediately upstream of the filter 8. The exhaust gas temperature sensor 12 detects the temperature (hereinafter referred to as "the pre-filter gas temperature") TDPFG of exhaust gases immediately upstream of the filter 8 and delivers a signal indicative of the sensed pre-filter gas temperature TDPFG to the ECU 2.

An engine coolant temperature sensor 13 detects the temperature (hereinafter referred to as "the engine temperature") TW of a coolant circulating through the engine block of the engine and delivers a signal indicative of the detected engine temperature TW to the ECU 2. An oil temperature sensor 14 detects the temperature (hereinafter referred to as "the oil temperature") TOIL of engine oil for lubrication and the like of the engine 3 and delivers a signal indicative of the detected oil temperature TOIL to the ECU 2. An accelerator pedal opening sensor 15 (engine operating condition-detecting means) detects the degree of opening or stepped-on amount (hereinafter referred to as "the accelerator pedal opening") AP of an accelerator pedal, not shown, of the vehicle and delivers a signal indicative of the detected accelerator pedal opening AP to the ECU 2. Further, a DPF lamp 21 is connected to the ECU 2.

The ECU 2 is implemented by a microcomputer comprised of an I/O interface, a CPU, a RAM, and a ROM. The detection signals from the aforementioned sensors 11 to 15 are input to the CPU after the I/O interface performs A/D conversion and waveform shaping thereon.

In response to these input signals, the CPU determines an operating condition of the engine 3, and based on the determined operating condition of the engine, performs fuel injection control of the injector 6, including post injection, in accordance with control programs read from the ROM. Further, in the present embodiment, the ECU 2 implements the engine operating condition-detecting means, post injection control means, engine oil dilution amount-calculating means, fuel evaporation amount-calculating means, engine oil dilution state-estimating means, post injection amount-calculating means, and post injection amount-reducing means.

Figure 2:
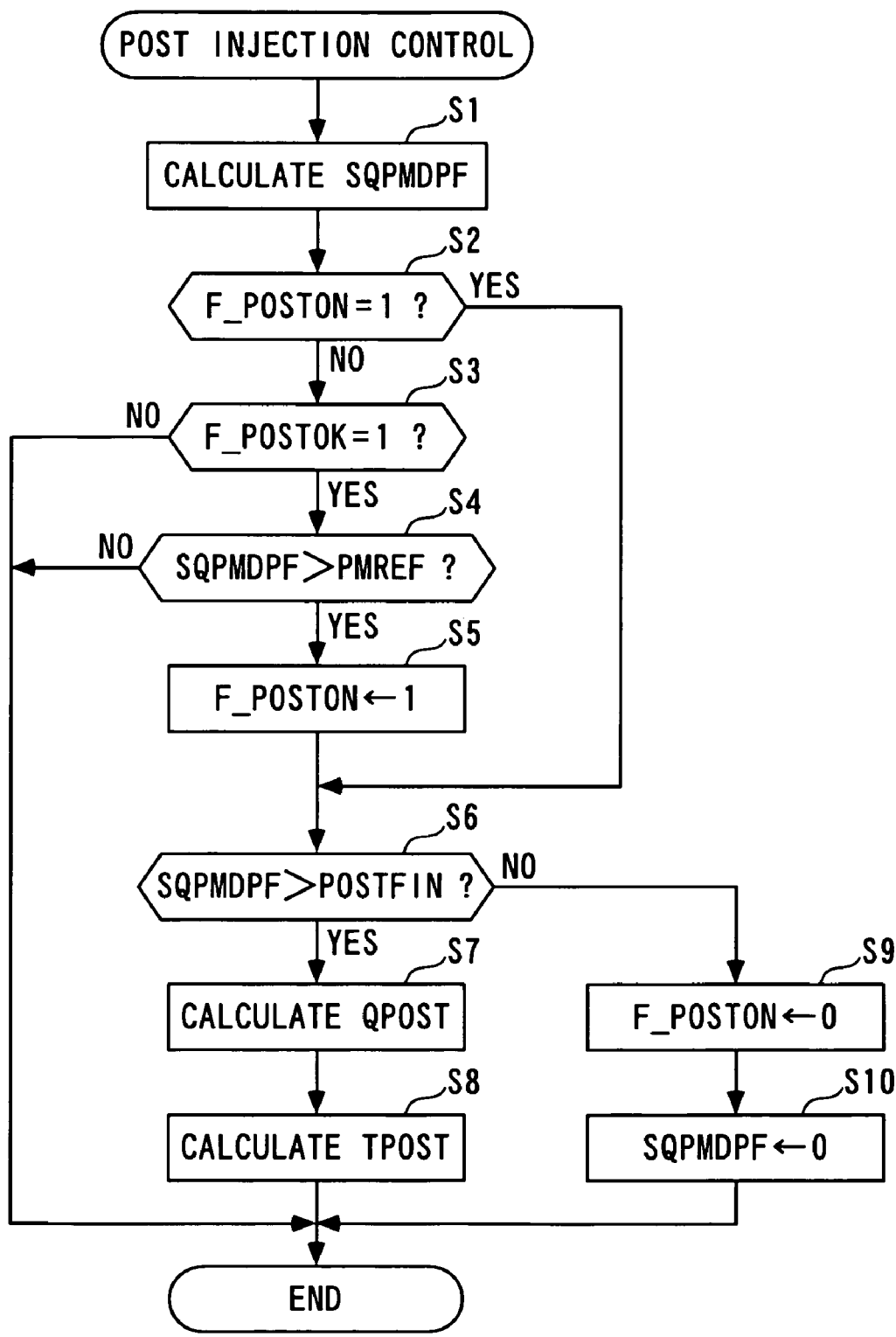
FIG. 2 is a flowchart showing a post injection control process.

The post injection control process shown in FIG. 2 controls the above-mentioned post injection, and is carried out in synchronism with generation of each TDC signal pulse. The post injection is executed when the amount PM deposited on the filter 8 becomes large, so as to regenerate the filter 8, with a view to preventing increased exhaust pressure from causing a drop in the output power of the engine 3 and/or degradation of fuel economy. In the post injection, fuel is injected from the injector 6 into the combustion chamber 3c during the expansion stroke or the exhaust stroke, whereby unburned fuel is caused to be contained in exhaust gases, and then burned e.g. by an oxidation catalyst 7 to thereby burn PM deposited on the filter 8, for regeneration thereof.

In the present process, first, in a step 1 (shown as S1 in abbreviated form in FIG. 2; the following steps are also shown in abbreviated form), the amount of PM deposited on the filter 8 (hereinafter referred to as "the PM deposition amount") SQPMDPF is calculated. More specifically, the amount of PM discharged from the engine 3 is calculated by searching a PM discharge amount map, not shown, according to the engine speed NE and the fuel injection amount QINJ. The fuel injection amount QINJ is calculated by searching a map (not shown) according to the engine speed NE and the accelerator pedal opening AP. Then, the amount of PM burned by the filter 8 is calculated by searching a table (not shown) according to the pre-filter gas temperature TDPFG. Then, the PM deposition amount per TDC event is calculated by subtracting the amount of PM burned for filter regeneration from the calculated amount of discharged PM. Then, the calculated PM deposition amount per TDC event is added to the immediately preceding value of the PM deposition amount SQPMDPF to thereby calculate the current PM deposition amount SQPMDPF.

It should be noted that, as described hereinafter, the current PM deposition amount SQPMDPF is reset to 0 when the regeneration operation for regenerating the filter 8 is completed, and hence represents the amount of PM remaining deposited on the filter 8 at the time point.

Then, it is determined in a step 2 whether or not a post injection execution flag F_POSTON is equal to 1. If the answer to this question is negative (NO), i.e. if the post injection is not being executed, it is determined in a step 3 whether or not an executing condition satisfaction flag F_POSTOK is equal to 1. The executing condition satisfaction flag F_POSTOK is set to 1 when conditions for executing post injection for coping with oil dilution (hereinafter referred to as "O/D") are satisfied.

If the conditions for executing post injection for coping with the O/D are not satisfied, it is determined that post injection is not to be executed, followed by terminating the present process. On the other hand, if the answer to the step 3 is affirmative (YES), it is determined in a step 4 whether or not the PM deposition amount SQPMDF calculated in the step 1 is larger than a predetermined value PMREF (e.g. 9 g). If the answer to this question is negative (NO), i.e. if the amount of deposition of PM on the filter 8 is still small, it is determined post injection is not to be executed, and the present process is immediately terminated.

On the other hand, if the answer to the question of the step 4 is affirmative (YES), i.e. if the PM deposition amount SQPMDPF becomes larger than the threshold value PMREF, it is determined that post injection is to be started for regeneration of the filter 8, and the post injection execution flag F_POSTON is set to 1 (step 5), followed by the process proceeding to a step 6. On the other hand, if the answer to the question of the step 2 is affirmative (YES), i.e. if post injection is being executed, the steps 3 to 5 are skipped, and the present process proceeds to the step 6.

In the step 6, it is determined whether or not the PM deposition amount SQPMDPF is larger than a reference value POSTFIN. The reference value POSTFIN is set to a small predetermined value close to 0. If the answer to this question is affirmative (YES), in the following steps 7 and 8, a post injection amount QPOST and a post injection timing TPOST are calculated, respectively, followed by terminating the process.

The post injection amount QPOST of fuel to be injected by the post injection is calculated as follows: First, a basic post injection amount is calculated by searching a map, not shown, according to the engine speed NE and the fuel injection amount QINJ, and then a feedback correction term is calculated with a predetermined feedback control algorithm such that the pre-filter gas temperature TDPFG becomes equal to a target temperature (e.g. 600° C.). Then, the calculated basic post injection amount is corrected by the feedback correction term to thereby calculate the post injection amount QPOST. Further, the post injection timing TPOST is calculated according to the post injection amount QPOST and so forth. Then, post injection is executed based on the post injection amount QPOST and the post injection timing TPOST, whereby the pre-filter gas temperature TDPFG is controlled such that it becomes equal to the target temperature, whereby the filter 8 is regenerated while preventing melting of the filter 8.

On the other hand, if the answer to the question of the step 6 is negative (NO), i.e. if the PM deposition amount SQPMDPF becomes not larger than the reference value POSTFIN, it is judged that PM deposited on the filter 8 is fully burned by execution of post injection whereby the regeneration of the filter 8 is completed, so that the post injection execution flag F_POSTON is reset to 0 (step 9). Then, the PM deposition amount SQPMDPF is reset to 0 (step 10), followed by terminating the present process.

Figure 3:
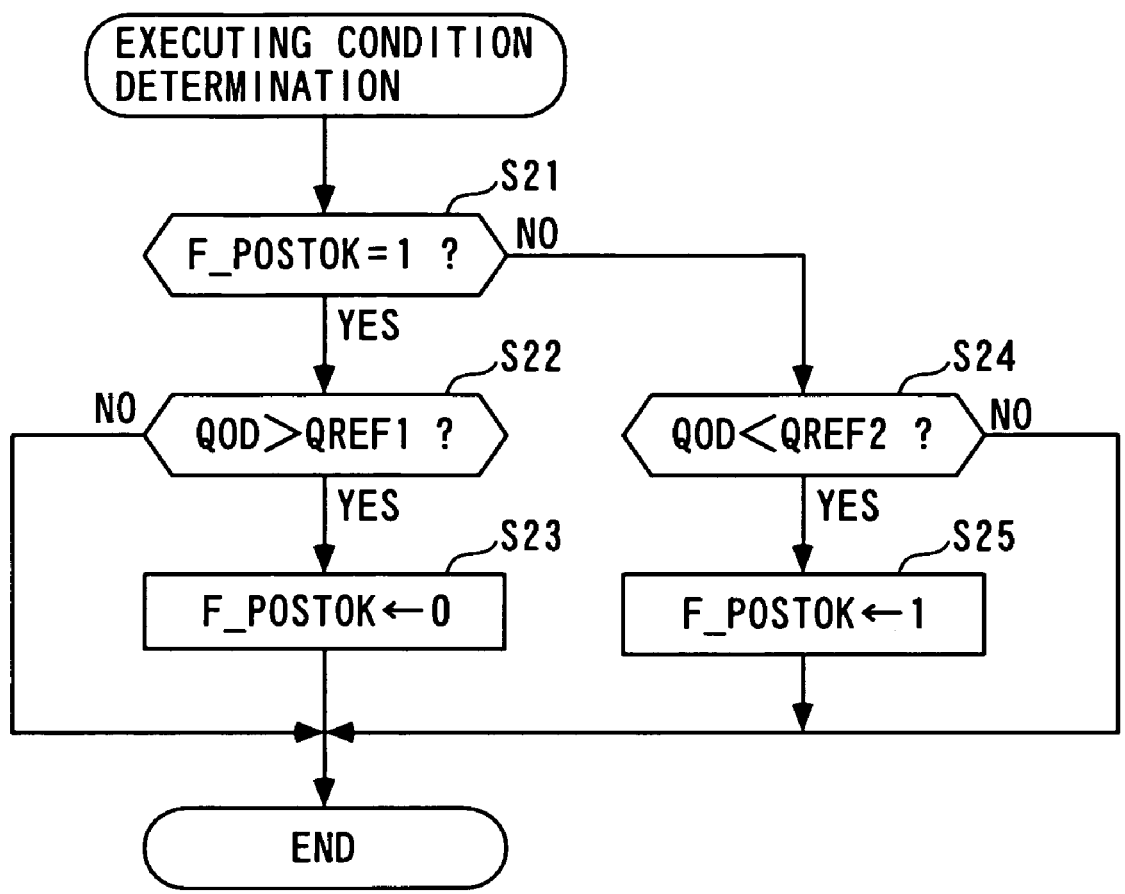
FIG. 3 is a flowchart showing an executing condition-determining process.

FIG. 3 shows an executing condition determining process for determining whether or not the conditions for executing post injection for coping with the O/D are satisfied, which is executed whenever a predetermined time period (e.g. 20 msec) elapses. First, in a step 21, it is determined whether or not the executing condition satisfaction flag F_POSTOK is equal to 1. If the answer to this question is affirmative (YES), i.e. if the executing conditions for post injection for coping with the O/D are satisfied, it is determined in a step 22 whether or not the O/D amount QOD is larger than a first threshold value QREF1 (corresponding to e.g. 10 wt %). If the answer to this question is negative (NO), the present process is immediately terminated. The O/D amount QOD represents the amount of fuel actually mixed in engine oil, and is calculated by a QOD calculating process, described hereinafter.

On the other hand, if the answer to the question of the step 22 is affirmative (YES), i.e. if the O/D amount QOD becomes larger than the first reference value QREF1, it is determined that the O/D amount QOD has increased, and post injection is not to be executed so as to prevent the O/D amount QOD from becoming too large, and to indicate the executing conditions are no longer satisfied, the executing condition flag F_POSTOK is set to 0 (step 23), followed by terminating the present process.

On the other hand, if the answer to the question of the step 21 is negative (NO), i.e. if the executing conditions are not satisfied, it is determined in a step 24 whether or not the O/D amount QOD is smaller than a second threshold value QREF2 (corresponding to e.g. 8 wt %) smaller than the first threshold value QREF1. If the answer to the question of this step is negative (NO), the present process is immediately terminated.

On the other hand, if the answer to the question of the step 24 is affirmative (YES), i.e. if the O/D amount QOD is smaller than the second threshold value QREF2, it is determined that there is no fear of the O/D amount QOD becoming too large, and the executing conditions for post injection for coping with the O/D are satisfied. Then, the executing condition flag F_POSTOK is set to 1 (step 25), followed by terminating the present process.

As described above, in a state in which the execution of post injection is permitted, if the O/D amount QOD becomes larger than the first reference value QREF1, the executing condition satisfaction flag F_POSTOK is set to 0 (step 23), thereby inhibiting execution of post injection. Further, from this state, if the O/D amount QOD becomes smaller than the second threshold value QREF2, the executing condition satisfaction flag F_POSTOK is set to 1 (step 25), thereby canceling the inhibition of post injection.

Figure 4:
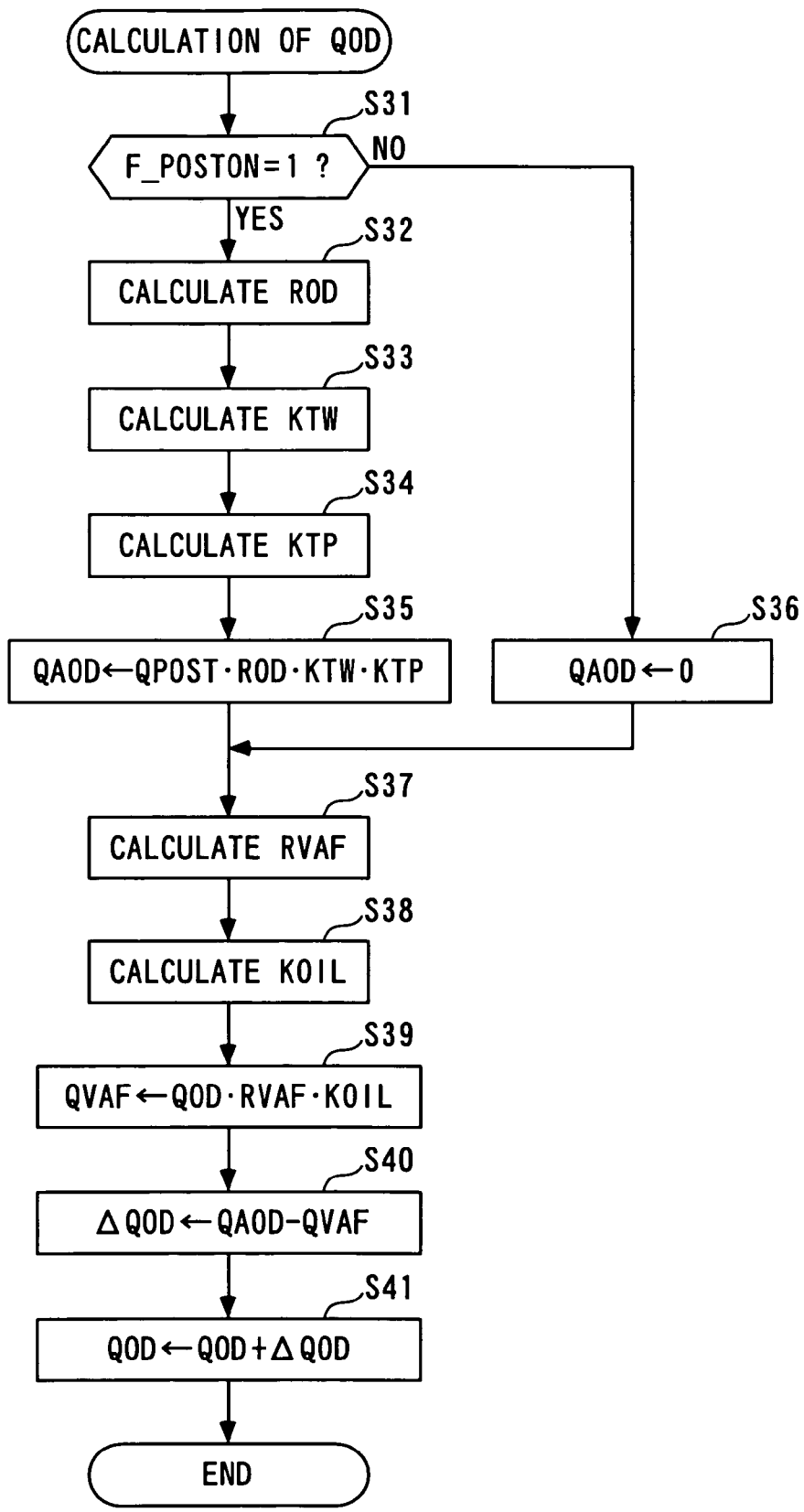
FIG. 4 is a flowchart showing a QOD calculating process.

FIG. 4 shows the QOD calculating process for calculating the O/D amount QOD for use in the step 22 in FIG. 3, which is executed in synchronism of generation of each TDC signal pulse. First, in a step 31, it is determined whether or not the post injection execution flag F_POSTON is equal to 1. If the answer to this question is affirmative (YES), i.e. if post injection is being executed, a O/D generation amount QAOD is calculated in the following steps 32 to 35. The O/D generation amount QAOD represents an amount of dilution of engine oil with fuel injected by post injection per TDC event, i.e. an amount of part of fuel injected by post injection, the part attached to a cylinder wall and the like without being exhausted from the combustion chamber 3c, and then mixed into engine oil.

First, in the step 32, a map (not shown) is searched according to the engine speed NE and the fuel injection amount QINJ, to thereby determine an O/D ratio ROD. The O/D ratio ROD represents a ratio of the amount of fuel mixed into engine oil to the total amount of fuel injected by post injection. Further, the map is configured such that as the engine speed NE is lower, the O/D ratio ROD is set to a larger value. This is because as the engine speed NE is lower, fuel injected by post injection is more difficult to atomize, and easier to attach to the cylinder wall.

Figure 5:
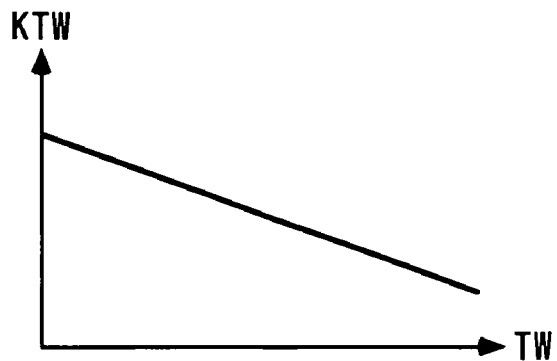
FIG. 5 is a diagram showing an example of a KTW table for use in the FIG. 4 process.

Next, a coolant temperature-dependent correction coefficient KTW is calculated by searching a KTW table shown in FIG. 5 according to the engine temperature TW (step 33). The KTW table is configured such that as the engine temperature TW is lower, the engine temperature-dependent correction coefficient KTW is set to a larger value, because as the engine temperature TW is lower, fuel injected by post injection is more difficult to atomize.

Figure 6:
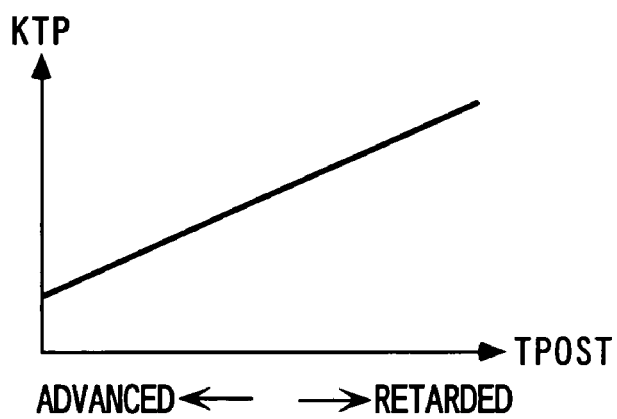
FIG. 6 is a diagram showing an example of a KTP table for use in the FIG. 4 process.

Next, a fuel injection timing-dependent correction coefficient KTP is calculated by searching a KTP table shown in FIG. 6 according to a post injection timing TPOST (step 34). The KTP table is configured such that as the post injection timing TPOST is more retarded, the fuel injection timing-dependent correction coefficient KTP is set to a larger value. This is because as the post injection timing TPOST is more retarded, i.e. as retarded with respect to the top dead center position of the compression stroke, the pressure and temperature of the inside of the cylinder become lower, and hence fuel injected by post injection becomes more difficult to atomize and easier to attach to the cylinder wall.

Next, the O/D generation amount QAOD is calculated using the post injection amount QPOST, and the O/D ratio ROD, the coolant temperature-dependent correction coefficient KTW, and the fuel injection timing-dependent correction coefficient KTP calculated in the respective steps 32 to 34, by the following equation (1)(step 35).

$$QAOD = QPOST \cdot ROD \cdot KTW \cdot KTP \quad (1)$$

Thus, the O/D generation amount QAOD can be properly calculated by multiplying the post injection amount QPOST by the O/D ratio ROD determined according to the engine speed NE and the fuel injection amount QINJ, and correcting the resulting value by the coolant temperature-dependent correction coefficient KTW and the fuel injection timing-dependent correction coefficient KTP.

On the other hand, if the answer to the question of the step 31 is negative (NO) (F_POSTON=0 holds), i.e. if post injection is not being executed, the O/D generation amount QAOD is set to 0 (step 36).

In steps 37 to 39 following the step 35 or 36, a fuel evaporation amount QVAF is calculated. The fuel evaporation amount QVAF represents the amount of fuel evaporated from engine oil per TDC event.

First, in the step 37, a fuel evaporation ratio RVAF is calculated by searching a map (not shown) according to the engine speed NE and the fuel injection amount QINJ. The fuel evaporation ratio RVAF represents a ratio of the amount of evaporated fuel to the total amount of fuel mixed into engine oil. Further, the above map is configured such that as the engine speed NE is larger and/or the fuel injection amount QINJ is larger, the fuel evaporation ratio RVAF is set to a larger value. This is because as the engine speed NE is larger and/or the fuel injection amount QINJ is larger, the temperature of the engine block of the engine 3 is higher, and hence fuel is easier to evaporate from engine oil.

Figure 7:
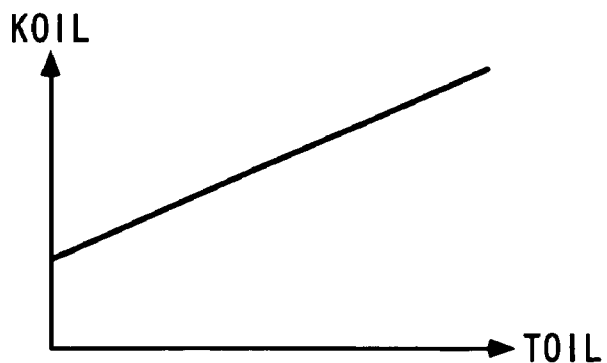
FIG. 7 is a diagram showing an example of a KOIL table for use in the FIG. 4 process.

Next, an oil temperature-dependent correction coefficient KOIL is calculated by searching a KOIL table shown in FIG. 7 according to the oil temperature TOIL (step 38). The KOIL table is configured such that as the oil temperature TOIL is higher, the oil temperature-dependent correction coefficient KOIL is set to a larger value, since as the oil temperature TOIL is higher, engine oil is easier to evaporate from engine oil.

Next, the fuel evaporation amount QVAF is calculated using the O/D amount QOD, and the fuel evaporation ratio RVAF and the oil temperature-dependent correction coefficient KOIL determined in the respective steps 37 and 38, by the following equation (2)(step 39).

$$QVAF = QOD \cdot RVAF \cdot KOIL \quad (2)$$

Thus, the fuel evaporation amount QVAF can be properly calculated by multiplying the O/D amount QOD by the fuel evaporation ratio RVAF determined according to the engine speed NE and the fuel injection amount QINJ, and correcting the resulting value by the oil temperature-dependent correction coefficient KOIL.

Next, the difference between the O/D generation amount QAOD and the fuel evaporation amount QVAF calculated in the respective steps 35 and 39 is calculated as the per-TDC O/D amount ΔQOD (step 40). Then, the calculated per-TDC O/D amount ΔQOD is added to the current value of the O/D amount QOD to thereby calculate the O/D amount (step 41), followed by terminating the present process.

As is clear from the calculation method described above, the calculated O/D amount QOD is a cumulative value of the per-TDC O/D amount ΔQOD representative of the amount of O/D per TDC event, and hence properly represents the amount of fuel actually mixed in engine oil at the time. It should be noted that the O/D amount QOD is reset to 0 when engine oil is replaced.

Figure 8:
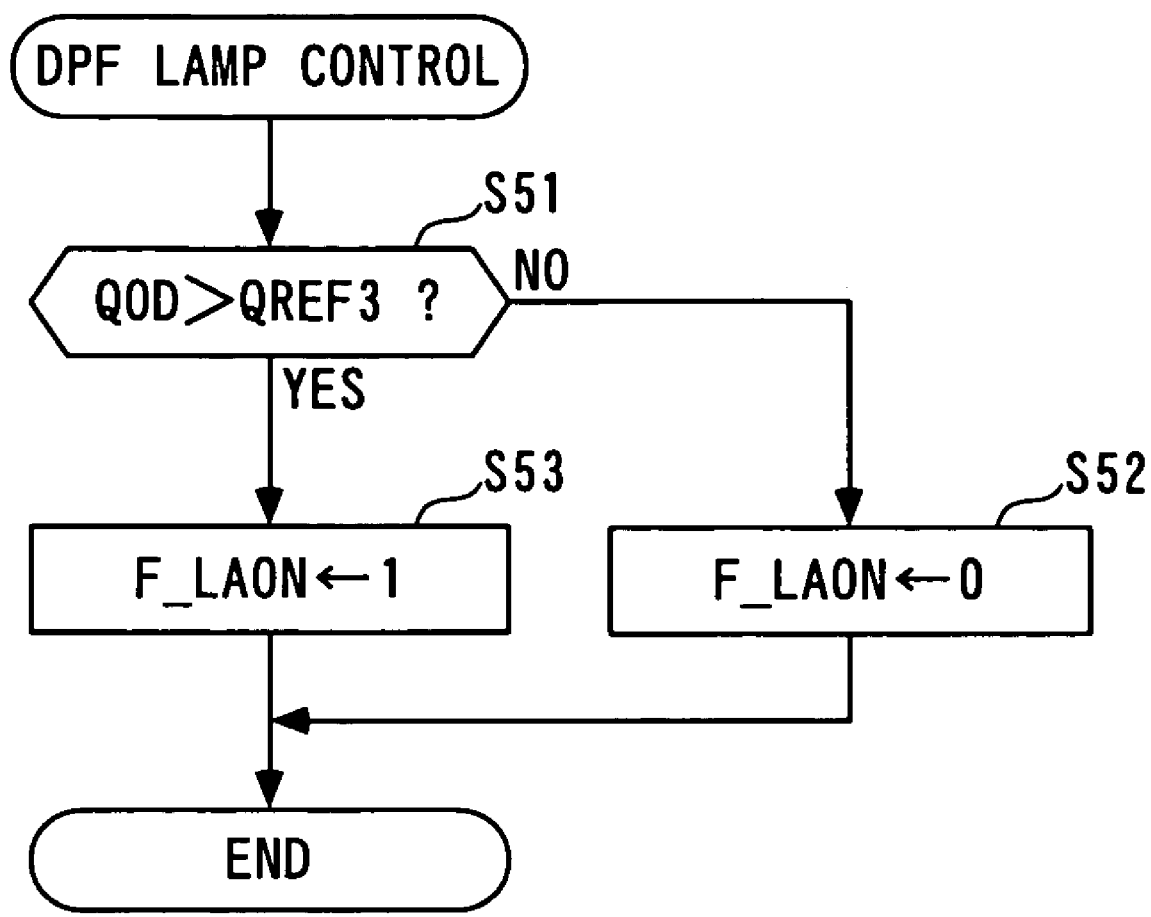
FIG. 8 is a flowchart showing a DPF lamp control process.

FIG. 8 shows a DPF lamp control process for controlling the operation of the DPF lamp 21 according to the O/D amount QOD calculated in the above-mentioned step 41, which is executed whenever a predetermined time period (e.g. 100 msec) elapses. First, in a step 51, it is determined whether or not the O/D amount QOD is larger than a third threshold valve QREF3. The third threshold value QREF3 is set to a predetermined value (corresponding to e.g. 9 wt %) between the first threshold value QREF1 and the second threshold value QREF2.

If the answer to the question of the step 51 is negative (NO), a lamp flag F_LAON is set to 0 (step 52), followed by terminating the present process. This controls the DPF lamp 21 to a light-off state. On the other hand, if the answer to the question of the step 51 is affirmative (YES), i.e. if QOD>QREF3 holds, the lamp flag F_LAON is set to 1 (step 53), followed by terminating the present process. This causes the DPF lamp 21 to flash on and off, to thereby urge the driver to drive the vehicle by high-load operation of the engine.

During high-load operation of the engine, the temperature of exhaust gases is very high, which places the filter 8 in a high-temperature condition, and hence PM deposited on the filter 8 burns without executing post injection, to thereby regenerate the filter 8. Therefore, in the above step 51 and 53, when QOD>QREF3 holds, which means the O/D amount QOD is relatively large, by urging the driver toward high-load driving and thereby causing him/her to execute the high-load driving, the PM deposition amount SQPMDPF becomes difficult to exceed the aforementioned threshold value PMREF, whereby the frequency of execution of post injection is reduced, which makes it possible to prevent the O/D amount QOD from becoming too large.

As described heretofore, according to the present embodiment, the O/D generation amount QAOD which represents the amount of dilution of engine oil per TDC event, and the fuel evaporation amount QVAF of fuel evaporated from engine oil per TDC event are calculated, and the difference between the two is calculated as the per-TDC O/D amount ΔQOD. Further, a cumulative value of the per-TDC O/D amount ΔQOD is calculated as the O/D amount QOD. Therefore, using the O/D amount QOD, it is possible to accurately estimate the state of dilution of engine oil. Further, when the O/D amount QOD becomes larger than the first threshold value QREF1, the execution of post injection is inhibited, which makes it possible to properly control the O/D amount QOD such that it does not become too large, and maintain the intended function of engine oil. Further, when the O/D amount QOD becomes smaller than the second threshold value QREF2 during execution of inhibition of post injection, the inhibition is cancelled, which makes it possible to execute post injection just enough, whereby the filter 8 can be properly regenerated.

It should be noted that the present invention is not limited to the embodiment described above, but can be practices in various forms. For example, although in the above-described embodiment, the state of dilution of engine oil is estimated by the O/D amount QOD calculated according to the operating condition of the engine 3 and the post injection amount QPOST, this is not limitative, but the state of dilution of engine oil may be detected using a sensor. Further, although in the preferred embodiment, post injection is executed for regenerating the filter 8, this is not limitative, but it may be executed for other purposes, e.g. for reduction of NOx trapped by a NOx trap material that traps NOx contained in exhaust gases.

Further, although in the present embodiment, when the O/D amount QOD>the first threshold value QREF1 holds, the execution of post injection is inhibited, this is not limitative, but without inhibiting the execution of post injection, for example, the threshold value PMREF for use in the step 4 may be changed from the normal-time value to a value larger than the normal-time value, thereby reducing the frequency of execution of post injection. Further, if the engine is equipped not only means for post injection but also other means for regenerating the filter 8 without using post injection, the regeneration of the filter by the other regenerating means may be preferentially executed when the O/D amount QOD has increased. Further, although in the embodiment, the present invention is applied to a diesel engine, by way of example, this is not limitative, but it can be applied to various types of engines, such as gasoline engines and engines for ship propulsion machines, such as an outboard motor having a vertically-disposed crankshaft.

It is further understood by those skilled in the art that the foregoing is a preferred embodiment of the invention, and that various changes and modifications may be made without departing from the spirit and scope thereof.

What is claimed is:

1. A control system for an internal combustion engine having an injector for injecting fuel into a combustion chamber, comprising:
   operating condition-detecting means for detecting an operating condition of the engine;
   post injection control means for executing post injection in which fuel is injected from the injector during an expansion stroke or an exhaust stroke of the engine, based on the detected operating condition of the engine including an amount of particulate matter (PM) in a filter is larger than a predetermined value;
   engine oil dilution amount-calculating means for calculating an amount of dilution of engine oil diluted with fuel injected by post injection;
   fuel evaporation amount-calculating means for calculating an amount of fuel evaporation from the engine oil; and
   engine oil dilution state-estimating means for estimating a state of dilution of the engine oil based on the calculated amount of dilution of engine oil and the calculated amount of fuel evaporation.

2. A control system as claimed in claim 1, comprising post injection amount-reducing means for reducing an amount of fuel injected by post injection executed by said post injection control means, according to the state of dilution engine oil estimated by said engine oil dilution state-estimating means.

3. A method of controlling an internal combustion engine having an injector for injecting fuel into a combustion chamber, comprising:
   an operating condition-detecting step of detecting an operating condition of the engine;
   a post injection control step of executing post injection in which fuel is injected from the injector during an expansion stroke or an exhaust stroke of the engine, based on the detected operation condition of the engine including an amount of particulate matter (PM) in a filter is larger than a predetermined value;
   an engine oil dilution amount-calculating step of calculating an amount of dilution of engine oil diluted with fuel injected by post injection;
   a fuel evaporation amount-calculating step of calculating an amount of fuel evaporation from the engine oil; and an engine oil dilution state-estimating step of estimating a state of dilution of the engine oil based on the calculated amount of dilution of engine oil and the calculated amount of fuel evaporation.

4. A method as claimed in claim 3, comprising a post injection amount-reducing step of reducing an amount of fuel injected by post injection executed in said post injection control step, according to the state of dilution of engine oil estimated in said engine oil dilution state-estimating step.

* * * * *